(12) United States Patent
Schleifstein

(10) Patent No.: US 6,482,519 B1
(45) Date of Patent: Nov. 19, 2002

(54) COATED MICROPARTICLES, PLASTIC COMPOSITIONS AND METHODS

(75) Inventor: Robert Schleifstein, Edison, NJ (US)

(73) Assignee: Innovative Concepts Unlimited, New York, NY (US)

( * ) Notice: Subject to any disclaimer, the term of this patent is extended or adjusted under 35 U.S.C. 154(b) by 137 days.

(21) Appl. No.: 09/752,305

(22) Filed: Dec. 29, 2000

(51) Int. Cl.[7] ............................... B32B 15/02
(52) U.S. Cl. .............. 428/406; 428/402; 428/402.24; 428/403; 428/405; 428/407; 428/428; 428/429; 428/432; 428/448; 428/454
(58) Field of Search .................. 428/402, 402.24, 428/403, 405, 406, 407, 428, 429, 432, 448, 454

(56) References Cited

U.S. PATENT DOCUMENTS 5,650,213 A * 7/1997 Rizika et al. ............... 106/489
5,736,602 A * 4/1998 Crocker et al. ............ 106/31.04
6,225,434 B1 * 5/2001 Sadvary et al. ............... 427/387
6,268,456 B1 * 7/2001 Gregorovich et al. ....... 525/100

* cited by examiner

Primary Examiner—Samuel A. Acquah
(74) Attorney, Agent, or Firm—Perman & Green, LLP

(57) ABSTRACT

Method for producing novel microparticles, such as $1\mu$ to $20\mu$ diameter glass beads, by coating them to improve their flowability and to enable them to be distributed in predetermined depths of novel plastic coatings, extrusions, molded bodies, etc. The thin microparticle coatings are repellent to each other and to the plastic binder material, to predetermined degrees, to cause the particles to distribute adjacent the surface of the plastic body, or at a predetermined depth therebelow, to produce desired color-enhanced properties.

44 Claims, 1 Drawing Sheet

COATED MICROPARTICLES, PLASTIC COMPOSITIONS AND METHODS

BACKGROUND OF THE INVENTION

The present invention relates to microparticles, preferably glass beads having an average diameter up to about 70 microns, which are coated to improve their dry flowability and to reduce their wettability within plastic compositions, which affects their dispersibility within plastic coatings, extrusions and molded products, and to methods for producing such coated particles and for producing plastic bodies containing such coated particles.

1. Field of the Invention

The present invention is concerned with improving the dry flow properties of microparticles such as glass beads, plastic beads, glass flakes, mica and similar pigment and color-enhancing materials. Particles of such materials normally have a surface affinity and attraction for each other, particularly in the presence of moisture, so that they have poor flowability properties in bulk, such as from within a container. This results in the particles forming clusters, agglomerates or build-ups of a plurality of flakes, beads or other particles, which interfere with their handling properties, metering properties and the aesthetic nature of the particles for their desired properties, such as color uniformity, light reflection or refraction and similar properties, as well as avoidance of significant reduction in impact strength caused by the addition of agglomerates to plastics. The present invention is further concerned with improving the dispersing, orienting or migration properties of the aforementioned microparticles within liquid plastic compositions, such as solvent coating compositions and molten extrusion and molding compositions, whereby the microparticles are not merely wetted and drawn by gravity down into the depth of the coating, extrusion or molded product.

2. State of the Art

It is known to add thickeners such as asbestine pigment to resinous paint solutions containing microbeads to prevent or retard settling during the spray-application of reflective highway paints, and to coat the beads with thin organophilic films to improve adhesion or affinity or wettability of the beads in the resinous binder material, and reference is made to U.S. Pat. No. 2,574,971.

It is also known to coat microbeads with adhesion promoters, including organosilanes such as 3-aminopropyltriethoxysilane or 3-methacryloxypropyltrimethoxysilane to insure that the microbeads are firmly secured to the substrate in a retroreflective screen printing ink having a resinous binder material. Reference is made to U.S. Pat. No. 5,650,213.

Also, U.S. Pat. No. 5,736,602 discloses the addition of colloidal suspending agents to curable thermosetting resinous coating compositions containing glass microspheres to retain the glass beads in suspension in the resin binder system.

However, the prior art does not disclose coating particles to render them repellent to each other, to avoid clustering and agglomeration and to improve flowability, and/or to make them repellent to resinous or plastic binder materials to improve their distribution and/or predetermine their location within resinous or plastic coatings, extrusions or molded products.

SUMMARY OF THE INVENTION

The present invention relates to the coating of microparticles such as glass beads, plastic beads, glass flakes, mica, pigments and similar color-enhancing particulate materials, particularly glass microspheres having average particles sizes up to about $75\mu$, preferably from about $1\mu$ up to about $20\mu$, with materials which bond to the particle surfaces and impart free flowability to the particles in bulk and from their packages containing uniform dispersions of the particles in compositions, particularly compositions containing plastic or resinous binder materials for applying liquid coatings, or for extruding plastic rods, fibers or films, or for molding plastic bodies.

According to a preferred embodiment, the present invention relates to producing free-flowing self-repelling microparticles which can be easily compounded into conventional resinous or plastic compositions, without the need for thickening or viscosity-increasing additives, which particles are also repelled to predetermined and/or different degrees by compositions into which they are compounded, most particularly by the plastic or resinous binder materials thereof, to produce desired aesthetic or other results. One desired result can be to cause expensive microparticles to be concentrated adjacent the outer surface of the coating, extrusion or molded product to enable the use of smaller amounts of the microparticles, and/or to reduce surface imperfections such as flow lines during the extrusion or orienting of fibers or films.

BRIEF DESCRIPTION OF THE DRAWINGS

In the accompanying drawings.

DETAILED DESCRIPTION OF THE PREFERRED EMBODIMENT

The present invention relates to the coating of microparticles with non-reactive, inert compounds or compositions having non-functional or lowly-functional blocking groups, most particularly silane, silicone or fluorochemical compounds or compositions, which have little or no affinity for themselves or for other materials such as conventional thermoplastic resins or lastics, or for conventional volatile vehicles such as water and organic solvents.

However, this invention deals primarily with glass particles, of various geometries, including spheres and flakes, having average diameters of less than 50 microns, preferably less than 20 microns, used in polymer applications with optimal effects. In the preferred embodiments, glass microspheres of an average diameter ranging from $4-10\mu$ are treated. Whereas prior to treatment the dry spheres are compacted and difficult to properly meter into polymers during their compounding phase, after treatment the spheres are free flowing and can be easily fed into the polymer matrix during compounding, in spite of the high humidity often present during compounding. This free flowing characteristic serves to optimize the physical properties of any composition containing the treated spheres.

More importantly, the repellent coatings can be used to direct the microparticles to a specific area of the composite, most particularly to adjacent the surface of thermoplastic polymers. This will occur during the coating, melt blending (extrusion) and molding phases. Molding can be blow molding, injection molding or rotational injection molding. By making the small particles lodge near, but not above, the surface of the polymer, a composite is produced that will exhibit diffuse reflectance by means of the scattering of incident light and will greatly enhance the performance of both conventional and interference pigments. If the polymer is quite thin and translucent or transparent at most thicknesses, reflectivity is also enhanced by means of specular reflectance. The result is a deeper, richer color for the same pigment loading and the appearance of greater depth for the pigmented polymer. This enhanced effect is noticeable even for very dark colors. In yet another embodiment, repellent coatings can be applied to glass particles that have previously been metallized or colored.

The selection of the coating agent can be made on the basis of the polymer type and desired reflectivity. For example, in polyamide polymer, the use of silanes may suffice, but in an alloy of polystyrene and polyphenylene oxide, the solvent or wetting nature of the polymer could require the use of a fluorochemical to obtain the desired repellency and reflective effect.

The repellent chemicals can be applied topically, either as a solvent solution or in neat (solvent-less) form. Alternatively, they can be applied in emulsion form in a variety of conventional processes.

Figure 1:
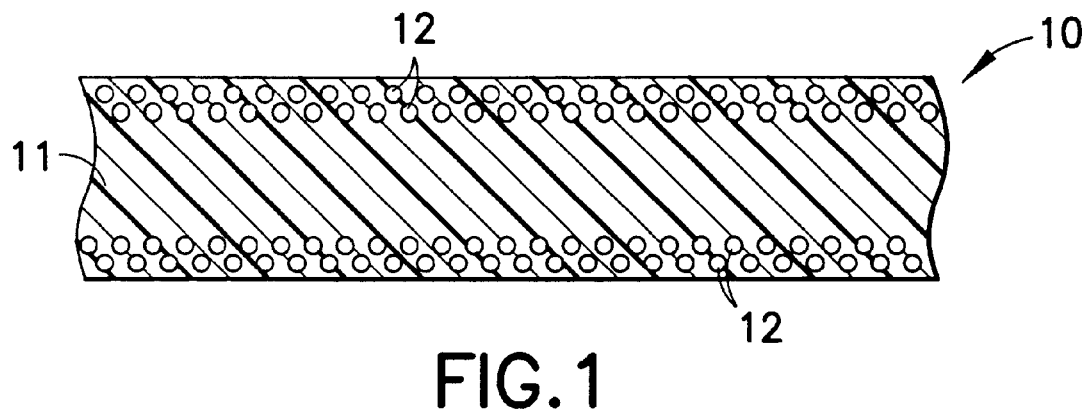
FIG. 1 is a diagrammatic cross-section, to an enlarged scale, of an extruded rod of a thermoplastic polymer composition containing repellent microparticles concentrated adjacent the outer surface of the rod.

Referring to FIG. 1, the extruded thermoplastic rod 10 thereof comprises a thermoplastic polymer 11, such as a polyamide, having a high concentration of coated glass microspheres 12 adjacent the outer surface thereof.

Such rods are extruded in conventional manner from extrudable polyamide polymer into which is mixed about 10% by weight of a mixture of 4 to 20$\mu$ glass beads having refractive indexes of 1.9 and 2.1, each coated with a volatile solvent solution of phenyltrimethoxysilane and dried to a thickness of about 0.001 times the diameter of the beads. The extruded plastic rods 10 are reduced to pellet form for subsequent melt blending and molding into plastic bodies or extruding into plastic films or fibers. During melt blending and extrusion, the coated beads are poorly wetted and repelled by the polyamide binder material and migrate outwardly to the peripheral surface of the molten body as it is formed. This maximizes the aesthetic effect of the light-refractive glass beads and also has been found to reduce or eliminate flow lines, such as on the surface of extruded or blow-molded plastic films, which are common imperfections on conventional extruded and blow-molded plastic films. Their elimination appears to be due to a "ball-bearing effect" produced by the microspheres which reduce surface stresses as the films are oriented.

Figure 2:
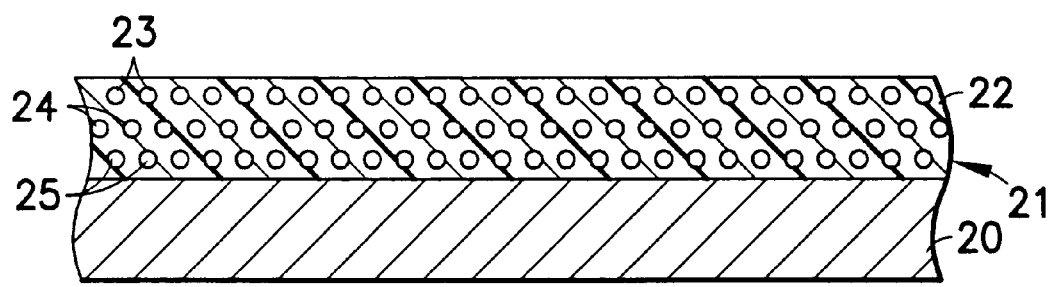
FIG. 2 is a diagrammatic cross-section, to an enlarged scale, of a substrate coated with a volatile vehicle-applied resin-based composition containing a variety of microparticles coated with different materials having different degrees of repellency with respect to the resin-based coating composition.

FIG. 2 of the drawings illustrates a substrate 20, such as of metal, textile fabric, road surface, glass or other support coated, painted or sprayed with a coating 21 formed from a volatile vehicle-containing composition comprising a thermoplastic resin binder material 22 and a mixture of solid particulate light-diffusing glass beads 23 and 24 and pigment particles 25.

The binder material comprises a polymer such as an acrylic, polyamide, polycarbonate, olefinic, styrene or other thermoplastic resin dissolved or dispersed in a suitable volatile organic solvent or vehicle, or in water, into which is compounded a plurality of different microparticles including conventional pigment particles and a mixture of different repellent-coated glass microparticles 23 and 24. For a polar thermoplastic polymer, such as polyamide, a silane, with either a phenyl group, a straight-chain alkyl group or a branchedchain alkyl group makes an effective "pop-up" coating. For polycarbonate polymer, the phenyl group would likely be soluble and would not function for "pop-up" purposes. A reactive silicone could be required in this case. For styrenics, only fluorochemicals produce the desired results. In general, varying the chain length of the hydrocarbon functionality minimizes the solubility and the degree of sinking in the polymer. For example a longer hydrocarbon chain will almost certainly add to "pop-up" properties in polyamide, polycarbonate or polyurethane polymer compositions.

Glass microparticles 23 and 24 comprise mixtures of glass microparticles having different refractive indexes such as 1.9 and 2.1. The glass microparticle mixture 23 is coated with a thin surface layer of a fluorochemical polymer which bonds thereto and imparts maximum repellency and surface migration to the beads 23. The glass microparticle mixture 24 is coated with a thin surface layer of a blend of a mixture of a (a) methyhydrogensilicone and a silanol-containing material or a silanol-containing silicone polymer, and (b) a silane, zirconate or titanate to which is attached a pendant functional group which increases the affinity or adhesion of the microparticles 24 for the plastic binder material 22 whereby they are wetted and sink to a greater depth than the microparticles 23.

During processing of the molten plastic composition or drying of the coating by evaporation of the solvent or vehicle, the pigment particles 25, which are wetted by and integrated into the binder material and solvent or vehicle, settle towards the bottom of the coating, adjacent the support 20. The blend-coated glass beads 24 have greater repellency for the resinous binder 22 and the solvent or vehicle than do the fluorochemical-coated glass beads 23 and therefore beads 23 pop-up or are repelled to adjacent the outer surface of the coating 21 while the beads 24 pop-up to a lesser degree and settle to an intermediate location, below beads 23.

Preferably the glass beads 24 are transparent and function as lenses which magnify and diffuse the color of the underlying pigment particles, which my include metal flakes or mica of different colors. The surface beads 23 reflect and refract the colors magnified and diffused by the underlying glass beads 24 to produce excellent coloration and depth of color.

The preferred silanes used in this invention to impart repellency are ($C_6$–$C_{10}$) alkyl or aryl di- or tri-alkoxysilanes. The latter is represented by phenyltrimethoxysilane, while the former can be hexyl- or isooctyltrimethoxysilane. These compounds are generally applied at a volumetric rate of 1–5 monomolecular layers to the glass. Although the application of a single monomolecular layer of chemical would theoretically be best, in reality such an application level to small particles would leave many of them totally uncoated. At an application rate of 1–5 monomolecular layers, the coating is reacted with and bonded to the surface of the glass, reducing or eliminating its tendency to migrate and cross-contaminate the composition and producing a "pop-up" effect, without causing undue cavitation of air in the compounded polymer. In percentage terms, about 0.15% by wt. of isooctyltrimethoxysilane is most desirable. Silanes with alkyl blocking groups of 6–10 carbons will prevent wet-out of the spheres by polar polymers such as polyamide or polycarbonate, while other, uncoated particles wet out. Blocking groups of the requisite size render the silane non-functional, non-polar and hydrophobic.

The preferred silicone used to impart repellency employs a methylhydrogensilicone fluid to provide "pop-up" and a hydroxyl-containing compound to provide the means to attach the silicone to the glass by means of covalent structures. Such a compound can be either sodium or potassium methyl siliconate, or alternatively a low molecular weight silanol-containing polymer. In percentage terms, about 0.43% by wt. of silicone fluid and about 0.12% of 30% aqueous sodium methyl siliconate are most desirable. Higher amounts of coating can be utilized, but the preferred proportionality between components should be maintained for optimal repellency and durability to glass. Up to about five times the level of coating given in this section can be employed. Ordinary non-reactive silicone fluids are to be avoided because of their tendency to migrate from the spheres into the plastic, where they can cause undesirable effects.

Suitable fluorochemicals for use according to the present invention are fluorinated polymeric compositions which have good bonding properties for the microparticles, particularly glass microspheres, and will not migrate or leach into the coating, fiber, film or molded product to produce undesirable effects. Such polymeric fluorochemical compositions produce the desirable "popup" property, without exhibiting undue migration of the fluorochemical. Examples of such compounds are Zonyl®B (DuPont), Zonyl® 8740 (DuPont), Scotchban® FC-845 (3M) and Scotchban® FC-808 (3M) and APG-652 (Advanced Polymers, Inc.). All of the above except the last item are emulsion polymers, with approximately 15–30% active polymer. Application can be accomplished by means of electrostatic deposition of the chemical emulsion to an oppositely-charged particle. This causes the active chemical component to transfer from the emulsion to the particles to be coated. Most commonly, a positively charged particle would adhere to a negatively charged substrate. Alternatively, either the emulsions described or other solution or emulsion polymers can be attached to the substrate by means of thermosetting resins, such as aminoplast, phenolic, epoxy, polyurethane or silicone. Aminoplast resins are preferred. About 1–4% treatment level is desirable. Such polymers have a much lower effect on polymer physical properties than do low molecular weight migratory fluorochemical compounds such as alkanol fluorophosphates. The last chemical is a solvent solution of a perfluoro-acrylate polymer. Optimal treatment is in the range of 2–4% chemical on the wt. of glass.

According to another embodiment of the present invention illustrated by FIG. 2 of the drawings, the degree or extent of "pop-up" or repellency of the present microparticles may be adjusted by the addition or blending of functional silane, zirconate or titanate molecules, having mercapto-, glycidoxy- or amino-pendant groups, to the coating compositions containing the normally non-functional silane, silicone or fluorochemical polymer repellency-imparting materials. This increases the affinity or adhesion of the thus-coated microparticles, whereby they are wetted to a greater extent by the polymer binder and sink to a greater depth than the "pop-up" particles bonded to the repellency-imparting materials which do not have such pendant groups, as illustrated by microparticles 23 and 24 in FIG. 2. A preferred blend of repellency-imparting materials in the coating for microparticles 24 comprises about 50%–80% of the non-functional repellency-imparting material, and 20% to 50% of the more functional adhesion-imparting material. The total level of coating will require 1.6–2.2% (on wt. of glass) of combined coating.

While the present invention is primarily concerned with the coating of glass microspheres, the invention is also applicable to a wide variety of other hydroxy-containing color-enhancing materials such as glass flakes, plastic spheres, mica, talc, wollastonite, clay, aluminum trihydrate, and similar materials which can be coated with and bonded to the present repellency-imparting materials in order to provide them with predetermined flotation, positioning or pop-up properties within thermoplastic polymer compositions. As previously noted, glass in other geometries, such as glass flakes, can also be employed in this invention. Suitable glass flakes preferably are between about 10 to 40$\mu$ long and up to 8$\mu$ thick.

The present functional or non-functional pop-up coatings are applied in known manner, such as by vapor deposition, electrostatic coating or by classical wet chemistry techniques.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Free-flowing, non-agglomerating microparticles having an average particle size up to about 70 microns, said particles each having a solid core coated with a thin surface layer of a repellency-imparting material which bonds to the surface of the core and is highly repellent with respect to itself and to synthetic thermoplastic resins.

2. Coated microparticles according to claim 1 in which the core of said particles is selected from the group consisting of glass spheres, glass flakes, plastic spheres, mica, talc, wollastonite, clay, and aluminum trihydrate.

3. Coated microparticles according to claim 2 comprising glass core microspheres having an average particle size between about 1$\mu$ and 20$\mu$.

4. Coated microparticles according to claim 1 in which the repellency-imparting material is selected from the group consisting of non-functional silanes, non-functional silicones and non-functional fluorochemical materials.

5. Coated microparticles according to claim 4 in which -the non-functional silane is a (C6–C10) alkyl or aryl di- or tri-alkoxysilane.

6. Coated microparticles according to claim 5 in which the non-functional alkyl alkoxysilane comprises isooctyltrimethoxysilane.

7. Coated microparticles according to claim 4 in which the non-functional silicone comprises a mixture of a methylhydrogensilicone and a silanol-containing compound bonded to the core.

8. Coated microparticles according to claim 7 in which said mixture comprises a methylhydrogensilicone and sodium methyl siliconate.

9. Coated microparticles according to claim 4 in which the non-functional fluorochemical material is a polymer, which is bonded to the core.

10. Coated microparticles coated with two components in which the adhesion-imparting material is selected from the group consisting of silane, zirconate and titanate compounds containing a mercapto-, glycidoxy- or amino-functional group, whereby the repellency of coated microparticles toward synthetic thermoplastic resins can be regulated by varying the ratio of adhesive and repellent components, said repellent compounds selected from the silicones and fluorochemicals noted in claims 7–9.

11. Coated microparticles according to claim 10 in which the repellency-imparting material comprises a blend of 20% to 50% of an adhesion-imparting material of claim 10 and 50% to 80% of a repellency-imparting material selected from the group consisting of non-functional silanes, non-functional silicones and non-functional fluorochemical materials.

12. Synthetic thermoplastic polymer body containing microparticles of a filler material having an average particle size between about 1 and 70 microns, said particles having a solid core coated with a thin surface layer of a material which is bonded to the surface of the core and is repellent with respect to itself and to the synthetic thermoplastic polymer, so as to be distributed adjacent the outer surface of said body.

13. A polymer body according to claim 12 comprising an extruded rod, fiber or film.

14. A polymer body according to claim 12 comprising a molded body.

15. A polymer body according to claim 12 comprising a layer coated onto a substrate.

16. A polymer body according to claim 12 in which the core of the microparticles is selected from the group consisting of glass spheres, glass flake, plastic spheres, mica, talc, wollastonite, clay and aluminum trihydrate.

17. A polymer body according to claim 16 in which the core comprises glass microspheres having an average particle size between about $4\mu$ and $20\mu$.

18. A polymer body according to claim 12 in which the coating material is selected from the group consisting of non-functional silanes, non-functional silicones and non-functional fluorochemical materials.

19. A polymer body according to claim 18 in which the non-functional silane is a (C6–C10) alkyl or aryl di- or tri-alkoxysilane.

20. A polymer body according to claim 19 in which the non-functional alkyl di- or tri-alkoxysilane comprises isooctyltrimethoxysilane.

21. A polymer body according to claim 18 in which the non-functional silicone comprises a mixture of a methylhydrogensilicone and a silanol-containing compound bonded to the core.

22. A polymer body according to claim 21 in which said mixture comprises a methylhydrogensilicone and sodium methyl siliconate.

23. A polymer body according to claim 18 in which the non-functional fluorochemical material is a polymer which is bonded to the core by means of thermosetting resins or electrostatic attraction.

24. A polymer body according to claim 12 in which a surface layer comprises an a adhesion-imparting coating component selected from the group consisting of silane, zirconate and titanate compounds containing a mercapto-, glycidoxy or amino-functional group and the repellency-imparting coating material is selected from a group of silicones and fluoropolymers.

25. A polymer body according to claim 24 in which the repellency-imparting coating material comprises a blend of 20% to 50% of an adhesion-imparting material of claim 24 and 50% to 80% of a repellency-imparting material selected from the group consisting of non-functional silicones and non-functional fluorochemicals.

26. Method for producing free-flowing, pourable microparticles having an average particle size between about 1 and 70 microns and which are self-repellent so as to be non-clustering and non-agglomerating, comprising coating the core of said particles with a thin surface layer of a material which is bonded to the surface of said core and is repellent with respect to itself and to synthetic thermoplastic resins.

27. Method according to claim 26 in which the core of said particles is selected from the group consisting of glass spheres, glass flakes, plastic spheres, mica, talc, wollastonite, clay, and aluminum trihydrate.

28. Method according to claim 27 comprising glass core microspheres having an average particle size between about $1\mu$ and $20\mu$.

29. Method according to claim 26 in which the coating material is selected from the group consisting of non-functional silanes, non-functional silicones and non-functional fluorochemical materials.

30. Method according to claim 29 in which the non-functional silane is a (C6–C10) alkyl or aryl di- or tri-alkoxysilane.

31. Method according to claim 30 in which the non-functional alkyl di- or tri-alkoxysilane comprises isooctyltrimethoxysilane.

32. Method according to claim 29 in which the non-functional silicone comprises a mixture of a methylhydrogensilicone and a silanol-containing compound bonded to the core.

33. Method according to claim 32 in which said mixture comprises a methylhydrogensilicone and sodium methyl siliconate.

34. Method according to claim 25 in which the non-functional fluorochemical material is a polymer which is bonded to the core by means of thermosetting resins or by electrostatic attraction.

35. Method according to claim 26 in which the adhesion-imparting material is selected from the group consisting of silane, zirconate and titanate compounds containing a mercapto-, glycidoxy or amino-functional group and a repellency-imparting group consisting of silicone and fluorochemical polymers, whereby the coated microparticles are repellent toward synthetic thermoplastic resins.

36. Method for producing plastic bodies containing microparticles located at predetermined areas at and/or below the outer surface of the thermoplastic binder material which comprises mixing with a liquid thermoplastic polymer binder material desired quantity of pourable microparticles having an average particle size up to about 70 microns and which are made self-repellent and repellent to a predetermined degree with respect to said thermoplastic polymer binder material by pre-coating the core of said particles with a thin surface layer of a repellency-imparting material which is repellent to itself and to said binder material.

37. Method according to claim 36 in which the core of said particles is selected from the group consisting of glass spheres, glass flakes, plastic spheres, mica, talc, wollastonite, clay and aluminum trihydrate.

38. Method according to claim 37 comprising glass core microspheres having an average particle size between about $1\mu$ and $20\mu$.

39. Method according to claim 36 in which the repellency-imparting material is selected from the group consisting of non-functional silanes, non-functional silicones and non-functional fluorochemical materials.

40. Method according to claim 39 in which the non-functional silane is a (C6–C10) alkyl or aryl di- or tri-alkoxysilane.

41. Method according to claim 40 in which the non-functional alkyl di- or tri-alkoxysilane comprises isooctyltrimethoxysilane.

42. Method according to claim 39 in which the non-functional silicone comprises a mixture of a methylhydrogensilicone and silanol-containing compound bonded to the core.

43. Method according to claim 42 in which said mixture comprises a methyl siliconate.

44. Method according to claim 36 in which the adhesion-imparting material is selected from the group consisting of silane, zirconate and titanate compounds containing a mercapto-, glycidoxy or amino-functional group and the repellency-imparting material selected from a selected group of silicone and fluoropolymers, whereby the coated microparticles are repellent to synthetic thermoplastic resins.

* * * * *

UNITED STATES PATENT AND TRADEMARK OFFICE
CERTIFICATE OF CORRECTION

PATENT NO. : 6,482,519 B1
DATED : November 19, 2002
INVENTOR(S) : Schleifstein

It is certified that error appears in the above-identified patent and that said Letters Patent is hereby corrected as shown below:

<u>Title page,</u>
Item [73], please change to: -- Prizmalite Industries, Inc., New York, NY (US) --

<u>Column 6,</u>
Line 42, please remove the first "-"

Signed and Sealed this

First Day of April, 2003

JAMES E. ROGAN
*Director of the United States Patent and Trademark Office*